United States Patent
Adnan et al.

(10) Patent No.: US 8,554,494 B2
(45) Date of Patent: Oct. 8, 2013

(54) PUMP INTEGRITY MONITORING

(75) Inventors: Sarmad Adnan, Sugar Land, TX (US); Evgeny Khvoshchev, Sugar Land, TX (US); Nikolay Baklanov, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 663 days.

(21) Appl. No.: 12/692,123

(22) Filed: Jan. 22, 2010

(65) Prior Publication Data

US 2010/0174496 A1 Jul. 8, 2010

Related U.S. Application Data

(63) Continuation of application No. 11/617,338, filed on Dec. 28, 2006, now abandoned, which is a continuation-in-part of application No. 11/482,846, filed on Jul. 7, 2006, now Pat. No. 7,401,500.

(51) Int. Cl.
*G01B 5/00* (2006.01)

(52) U.S. Cl.
CPC ........................................ *G01B 5/00* (2013.01)
USPC .......................................................... 702/39

(58) Field of Classification Search
CPC .............................................. G01N 2291/044
USPC ........................................................... 702/39
See application file for complete search history.

(56) References Cited

U.S. PATENT DOCUMENTS

| | | | |
|---|---|---|---|
| 3,722,595 A * | 3/1973 | Kiel | 166/308.4 |
| 4,094,191 A | 6/1978 | Goetsch et al. | |
| 4,489,551 A | 12/1984 | Watanabe et al. | |
| 4,734,011 A * | 3/1988 | Hall, Jr. | 417/2 |
| 5,008,841 A | 4/1991 | McElroy | |
| 5,499,538 A | 3/1996 | Glidewell et al. | |
| 5,702,598 A | 12/1997 | Lemon et al. | |
| 5,825,657 A | 10/1998 | Hernandez | |
| 6,087,945 A | 7/2000 | Yasuda | |
| 6,295,510 B1 * | 9/2001 | Discenzo | 702/183 |
| 6,338,283 B1 | 1/2002 | Blazquez Navarro et al. | |
| 6,351,714 B1 * | 2/2002 | Birchmeier | 702/56 |
| 6,675,665 B2 | 1/2004 | Blazquez Navarro et al. | |
| 6,697,741 B2 | 2/2004 | Yu et al. | |
| 6,901,791 B1 | 6/2005 | Frenz et al. | |
| 7,013,223 B1 | 3/2006 | Zhang et al. | |
| 7,437,272 B2 * | 10/2008 | Samson, Jr. | 702/183 |
| 2002/0023495 A1 | 2/2002 | Morganti | |
| 2002/0124666 A1 | 9/2002 | Navarro et al. | |
| 2002/0180613 A1 * | 12/2002 | Shi et al. | 340/853.1 |
| 2004/0167738 A1 * | 8/2004 | Miller | 702/114 |
| 2004/0230384 A1 | 11/2004 | Haynes et al. | |
| 2007/0192031 A1 * | 8/2007 | Li et al. | 702/6 |

FOREIGN PATENT DOCUMENTS

| | | |
|---|---|---|
| WO | 03091614 | 11/2003 |
| WO | 2004102052 | 11/2004 |

* cited by examiner

*Primary Examiner* — Edward Raymond
(74) *Attorney, Agent, or Firm* — Myron Stout; Daryl R. Wright; Tim Curington

(57) ABSTRACT

A method of monitoring integrity of a pump. The method may include recording timing information of the pump during operation while simultaneously sampling acoustic data with a high speed equidistant acquisition mechanism or at a rate based on the speed of the pump in operation. The acquisition of acoustic data is followed by evaluation thereof. Such techniques may improve resolution of acquired data while substantially increasing processor capacity for evaluation. A pump integrity monitor for carrying out such techniques is also described.

22 Claims, 7 Drawing Sheets

PUMP INTEGRITY MONITORING

CROSS-REFERENCE TO RELATED APPLICATION

This application claims priority to and is a Continuation of U.S. patent application Ser. No. 11/617,338 filed on Dec. 28, 2006 now abandoned, which is incorporated herein by reference. U.S. patent application Ser. No. 11/617,338 is a Continuation in Part of U.S. patent application Ser. No. 11/482,846, filed on Jul. 7, 2006, which is incorporated herein by reference.

BACKGROUND

Embodiments described relate to the monitoring of pumps in use. In particular, embodiments of oilfield pumps and techniques for their monitoring with a pump integrity monitor are described.

BACKGROUND OF THE RELATED ART

Large oilfield operations generally involve any of a variety of positive displacement or centrifugal pumps. Such pumps may be employed in applications for accessing underground hydrocarbon reservoirs. For example, positive displacement pumps are often employed in large scale high pressure applications directed at a borehole leading to a hydrocarbon reservoir. Such applications may include cementing, coiled tubing, water jet cutting, or hydraulic fracturing of underground rock.

A positive displacement pump such as those described above may be a fairly massive piece of equipment with associated engine, transmission, crankshaft and other parts, operating at between about 200 Hp and about 4,000 Hp. A large plunger is driven by the crankshaft toward and away from a chamber in the pump to dramatically effect a high or low pressure thereat. This makes it a good choice for high pressure applications. Indeed, where fluid pressure exceeding a few thousand pounds per square inch (PSI) is to be generated, a positive displacement pump is generally employed. Hydraulic fracturing of underground rock, for example, often takes place at pressures of 10,000 to 20,000 PSI or more to direct an abrasive containing fluid through a borehole such as that noted above to release oil and gas from rock pores for extraction.

Whether a positive displacement pump as described above, a centrifugal pump, or some other form of pump for large scale or ongoing operations, regular pump monitoring and maintenance may be sought to help ensure uptime and increase efficiency of operations. That is, like any other form of industrial equipment a pump is susceptible to natural wear that could affect uptime or efficiency. This may be of considerable significance in the case of pumps for large scale oilfield operations as they may be employed at a production site on a near round the clock basis. For example, in the case of hydraulic fracturing applications, a positive displacement pump may be employed at a production site and intended to operate for six to twelve hours per day for more than a week.

Wear on pump components during operation may present in a variety of forms. For example, internal valve seals of a pump may be prone to failure, especially where abrasive fluids are directed through the pump during an application. Issues with other pump components may develop during operation such as plunger wear, loosening engine mounts, deteriorating crankshaft bearings, and transmission breakdown in such forms as a slipping clutch or broken gear teeth. Thus, as indicated above, regular pump monitoring and maintenance of pump health may be an important part of ongoing pump operations.

Issues with wearing pump components such as those indicated above may be accompanied by certain vibrations particular to the type of wear taking place. Therefore, it is not uncommon to monitor the health of a pump during operation by taking into account such acoustic or vibration information. For example, a positive displacement pump may be evaluated during operation by employing an acoustic sensor coupled to the pump. The acoustic sensor may be a conventional sonic transmitter used to detect high-frequency vibrations particular to a leak or incomplete seal within the chamber of the positive displacement pump, such a leak being a common precursor to pump failure. By employing an acoustic sensor in this manner, the costly and somewhat unreliable alternative of regularly timed interruption of pump operation for manual seal inspection and replacement may be avoided. Similar acoustic monitoring of the health of the pump may be employed for the detection of other types of potential pump component wearing as well.

The above described technique of monitoring the health of the pump via detection of acoustic information during pump operation faces several practical challenges in implementation. For example, pump operations often employ several pumps and associated equipment simultaneously at a production site. In fact, in a multi-pump operation several pumps may be in fluid communication with one another through a common manifold. Therefore, even the detection of a given unhealthy pump condition may not be indicative of the particular pump having the unhealthy condition.

In order to distinguish the source of unhealthy acoustic data in a multi-pump operation as described above each pump of the multi-pump operation may be operated at a distinct RPM. That is, each pump of a multi-pump operation may operate at its own unique RPM with its own acoustically detectable timing. In this manner, occurrences of unhealthy acoustic data may be correlated to a particular pump operating at a given RPM. However, as a practical matter, operating a host of different pumps at a variety of RPM's for an operation may be near impossible to implement as indicated below.

The vast majority of oilfield pumps are only able to operate at a limited number of speeds making the above manner of operation potentially very difficult to achieve depending on the particular level of total output called for in a given operation. In fact, even if achievable, the operating of pumps at a variety of RPM's for an operation leads to uneven stress on the pumps with significantly greater loads applied to certain pumps. As a result, there is a greater likelihood of pump failure during the operation. Furthermore, regardless of the RPM assigned to a particular pump of a multi-pump operation, natural inconsistencies in behavior of pump components may require data collection over a period of operating time before any reliable acoustic analysis may take place. This delays diagnosis of unhealthy conditions and increases computational complexity of such monitoring, thus requiring significant processing capacity to carry out. Thus, addressing pump health over the long haul remains primarily addressed through regular manual intervention or acoustic monitoring techniques of limited diagnostic effectiveness.

SUMMARY

An embodiment of monitoring a pump assembly is disclosed wherein the pump assembly is operated and timing information relative thereto is recorded. Sampling of acoustic data then occurs with a high speed acquisition mechanism followed by an evaluation of the acoustic data in light of the timing information. Sampling of acoustic data may also take place based on a speed of the operating pump assembly.

DETAILED DESCRIPTION

Embodiments are described with reference to certain positive displacement pump assemblies for fracturing operations. However, other types of pumps may be employed for a variety of operations. Regardless, embodiments described herein include a pump assembly 100 that incorporates a pump integrity monitor 101 having particular capabilities. For example, the pump integrity monitor 101 may employ particularly located sensors in conjunction with a high speed data acquisition board that takes up acoustic data from the pump assembly 100 a rate algorithmically adjusted to minimize the effect of noise from neighboring equipment, including noise from equipment and pumps that are in fluid coupling with the pump assembly 100. Furthermore, the pump integrity monitor 101 may acquire data at a lower non-uniform sampling rate based on operating speed of equipment of the pump assembly 100, thereby drastically increasing processing capacity. In a particular example, the pump integrity monitor 101 may acquire acoustic data based on the speed of a pump 150 and thus, plot data in line with positioning characteristics of the pump 150 with less computational complexity.

Figure 1:
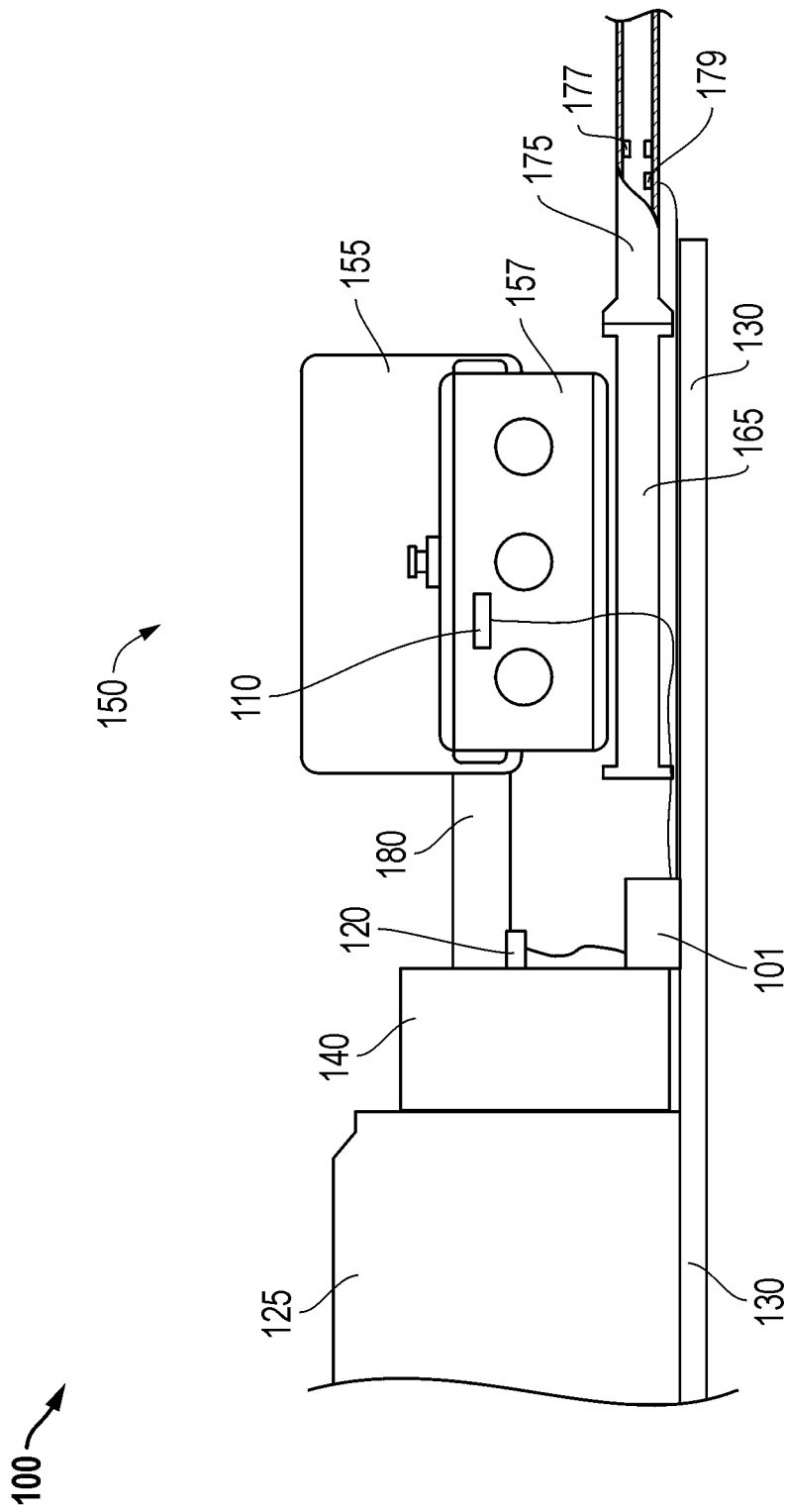
FIG. 1 is a side partially sectional view of a pump assembly employing an embodiment of a pump integrity monitor.

Referring specifically now to FIG. 1, an embodiment of a pump assembly 100 is shown equipped with a pump integrity monitor 101. In the embodiment shown, the pump assembly 100 includes a pump 150. The pump 150 shown is a positive displacement pump that may be of a triplex configuration and for use in a fracturing operation. However, other types of pumps, including centrifugal pumps, may be employed for a variety of applications according to embodiments described herein.

The above-described pump assembly 100 includes a variety of equipment with a multitude of parts susceptible to natural wearing and deterioration during operation. In the embodiment shown, this equipment includes a pump 150 with a fluid housing 157 in which a fluid is pressurized for distribution to a fluid pipe 165 and ultimately to a common fluid line 175 as described further herein. The pressurization of the fluid within the fluid housing 157 is created by plungers as directed by a rotating crankshaft 155 of the pump 150. With the fracturing pump 150 of the embodiment shown, pressurization of up to about 20,000 PSI may be achieved in this manner. Alternatively, other degrees of pressurization may be achieved for other applications. For example, where the pump 150 is to be employed in a cementing application, up to about 5,000 PSI may be generated as indicated. Additionally, embodiments of the pump 150 may be employed for coiled tubing or water jet cutting applications.

The crankshaft 155 is driven by a driveline mechanism 180, itself, driven by an engine 125 as directed through a transmission 140. The engine 125 may be a 200 Hp to 5,000 Hp prime mover. In the embodiment shown, all of this equipment is accommodated at the same platform 130 for placement and use at a production site, such as the well fracturing site 300 shown in FIG. 3. The platform 130 may be a skid for dropping in tact at the production site, part of a conventional trailer, or other form of delivery mechanism.

Figure 2:
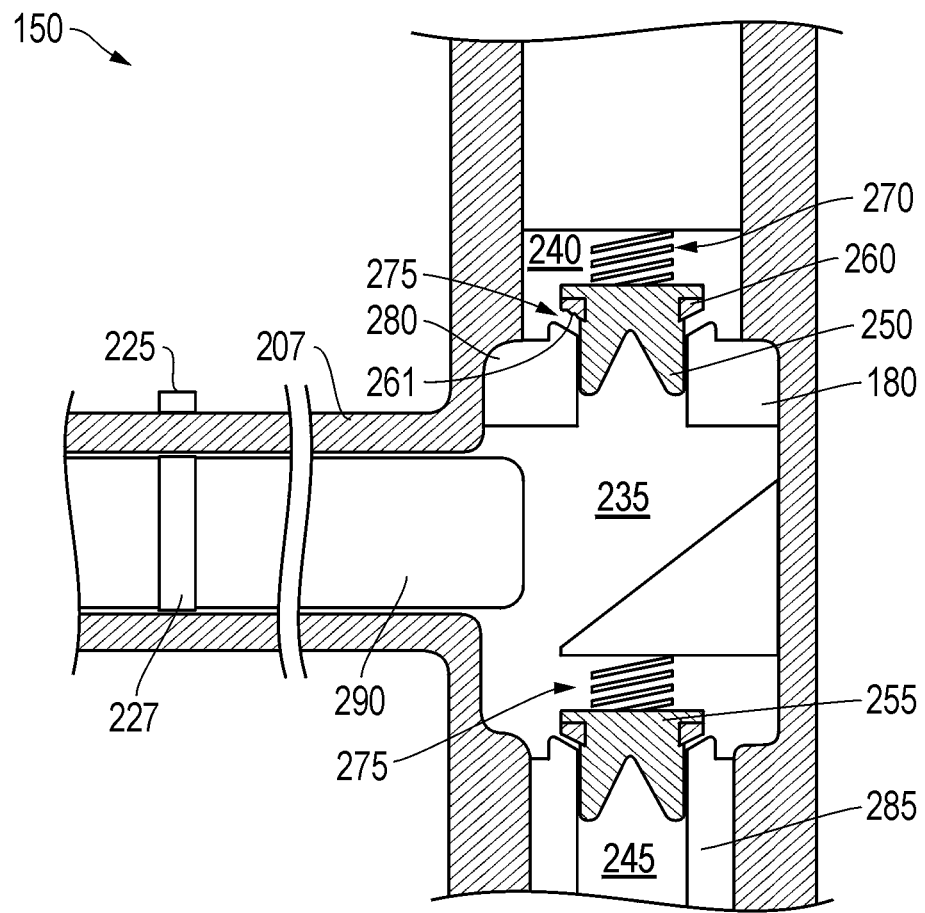
FIG. 2 is a cross-sectional view of a portion of the pump assembly of FIG. 1.

With added reference to FIG. 2, all of the above described equipment and components thereof, are subject to natural wear during operation as indicated. Therefore, the pump integrity monitor 101 is provided at the platform 130. In the embodiment shown, the pump integrity monitor 101 may include several circuit boards within a control box for sampling and analyzing a host of acoustic and other information. The pump integrity monitor 101 may also include a variety of sensors 120, 110, 179, 225 for obtaining such information during operation of the pump assembly 100 (see also FIG. 2). In particular, as shown in FIG. 1, the information may relate to harmonics of the pump assembly 100 in operation as detected by an acoustic sensor 110 or a pressure transducer 179. Additionally, as detailed further below, operational timing information such as the position of a driveline or crankshaft may be detected by a proximity switch 120 or an index sensor 225, respectively.

Similar to the embodiment described above, an index sensor may be coupled to a flywheel housing to obtain engine timing information. The engine timing sensor may be employ a magnetic pickup that senses position of a location on a rotating part coupled to the engine 125 such as its flywheel. In this sense, the information is obtained similar to information obtained by the index sensor 225 as described further below. This information may be analyzed by the pump integrity monitor 101 in conjunction with acoustic data obtained from an acoustic sensor coupled to the engine 125 or transmission 140 for establishing a condition thereof as described below. In an embodiment where the pump 150 is electrically driven, the sensors described here may be modified and located to acquire data regarding electrical current input.

Continuing with reference to FIG. 1, a circuit board of the pump integrity monitor 101 may be provided in the form of a high speed acquisition board which may include no microcontroller or processing capacity. Rather, the high speed acquisition board may be dedicated to sampling acoustic, vibration, or pressure sensor data at a rate of between about 100 to about 600,000 samples per second or more. The high speed acquisition board may be dedicated to obtaining data from the acoustic sensor 110 and/or the pressure transducer 179 as indicated above. These sensors 110, 179 may be specifically positioned to acquire acoustic vibration data from the pump assembly 100 during its operation. In an embodiment where the pump 150 is hydraulic in nature, such sensors 110, 179 may be positioned and equipped to acquire hydraulic pressure data in place of acoustic data as described herein. Regardless, the acquired data may be analyzed by the pump integrity monitor 101 in order to provide a recognizable pattern of pump health or integrity information so as to alert an operator of an unhealthy condition of the pump assembly 100 should one arise. Furthermore, it is not required that the pump flow rate remain constant in order to employ techniques described further below.

Continuing with reference to FIGS. 1 and 2, an example of an acoustically detectable unhealthy condition in the pump assembly 100 is described in detail. That is, while a host of harmonic or vibration data is provided by an operating pump assembly 100, certain data may be indicative of a variety of unhealthy conditions. Acoustic profiles of common unhealthy conditions may be pre-loaded on a processor of the pump integrity monitor 101 to allow analysis. With respect to the embodiments described herein, these unhealthy conditions may include plunger wear, loosening engine mounts, piston issues, deteriorating crankshaft bearings, and transmission breakdown in such forms as a slipping clutch or broken gear teeth to name a few. Another such example includes the unhealthy conditions of a failing pump valve seal 261 of a conformable valve seal 260 as shown in FIG. 2. This type of failure may be prone to occur in circumstances where abrasive fluids are directed through a pump 150 such as during a fracturing application.

With particular reference to FIG. 2, the pump 150 includes a plunger 290 for reciprocating within a plunger housing 207 toward and away from a chamber 235. In this manner, the plunger 290 effects high and low pressures on the chamber 235. For example, as the plunger 290 is thrust toward the chamber 235, the pressure within the chamber 235 is increased. At some point, the pressure increase will be enough to effect an opening of a discharge valve 250 to allow the release of fluid and pressure within the chamber 235. The amount of pressure required to open the discharge valve 250 as described may be determined by a discharge mechanism 270 such as valve spring which keeps the discharge valve 250 in a closed position until the requisite pressure is achieved in the chamber 235. In an embodiment where the pump 150 is to be employed in a fracturing operation pressures may be achieved in the manner described pressures of up to about 20,000 PSI may be achieved in the manner described here.

The plunger 290 may also effect a low pressure on the chamber 235. That is, as the plunger 290 retreats away from its advanced discharge position near the chamber 235, the pressure therein will decrease. As the pressure within the chamber 235 decreases, the discharge valve 250 will close returning the chamber 235 to a sealed state. As the plunger 290 continues to move away from the chamber 235 the pressure therein will continue to drop, and eventually a low or negative pressure will be achieved within the chamber 235. Similar to the action of the discharge valve 250 described above, the pressure decrease will eventually be enough to effect an opening of an intake valve 255. The opening of the intake valve 255 allows the uptake of fluid into the chamber 235 from a fluid channel 245 adjacent thereto. The amount of pressure required to open the intake valve 255 as described may be determined by an intake mechanism 275 such as spring which keeps the intake valve 255 in a closed position until the requisite low pressure is achieved in the chamber 235.

As described above, and with added reference to FIG. 1, a reciprocating or cycling motion of the plunger 290 toward and away from the chamber 235 within the pump 150 controls pressure therein. The valves 250, 255 respond accordingly in order to dispense fluid from the chamber 235 through a dispensing channel 240 and ultimately to a fluid pipe 165 at high pressure. That fluid is then replaced with fluid from within a fluid channel 245. All of the movements of the various parts of the pump 150 as described may resonate to a degree throughout the pump 150 including to its non-moving portions, such as at the fluid housing 157 within which the chamber 235 is located. Thus, as indicated above, an acoustic sensor 110 may be secured thereto for sensing such resonating vibrations.

As noted, certain vibrations detected by the acoustic sensor 110 of FIG. 1 may be indicative of an unhealthy valve seal 261 of the pump 150. For example, upon closer inspection of FIG. 2 it is apparent that the discharge valve 250 includes a conformable valve seal 260 for sealing off of the chamber 235. The conformable nature of such a valve seal 260 is conducive to the pumping of abrasive containing fluids through the pump 150 as is often called for in the case of fracturing operations. For example, the abrasive fluid may include a proppant such as sand, ceramic material or bauxite mixed therein. The conformable nature of the valve seal 260 allows it to conform about any proppant present at the interface 275 of the discharge valve 250 and seat 280. Unfortunately, the conformable nature of the valve seal 260 also leaves it susceptible to the unhealthy circumstance of degradation by such abrasive fluids.

A conformable valve insert 260 of urethane or other conventional polymers employed in a conventional fracturing operation as described above may degrade completely in about one to six weeks of substantially continuous use. As this degradation begins to occur a completed seal fails to form between the valve 250 and the valve seat 280. Thus, as noted above, an acoustic vibration indicative of an unhealthy condition of the operating pump 150 may then persist that is attributable to a growing leak between the chamber 235 and the dispensing channel 240.

Figure 3:
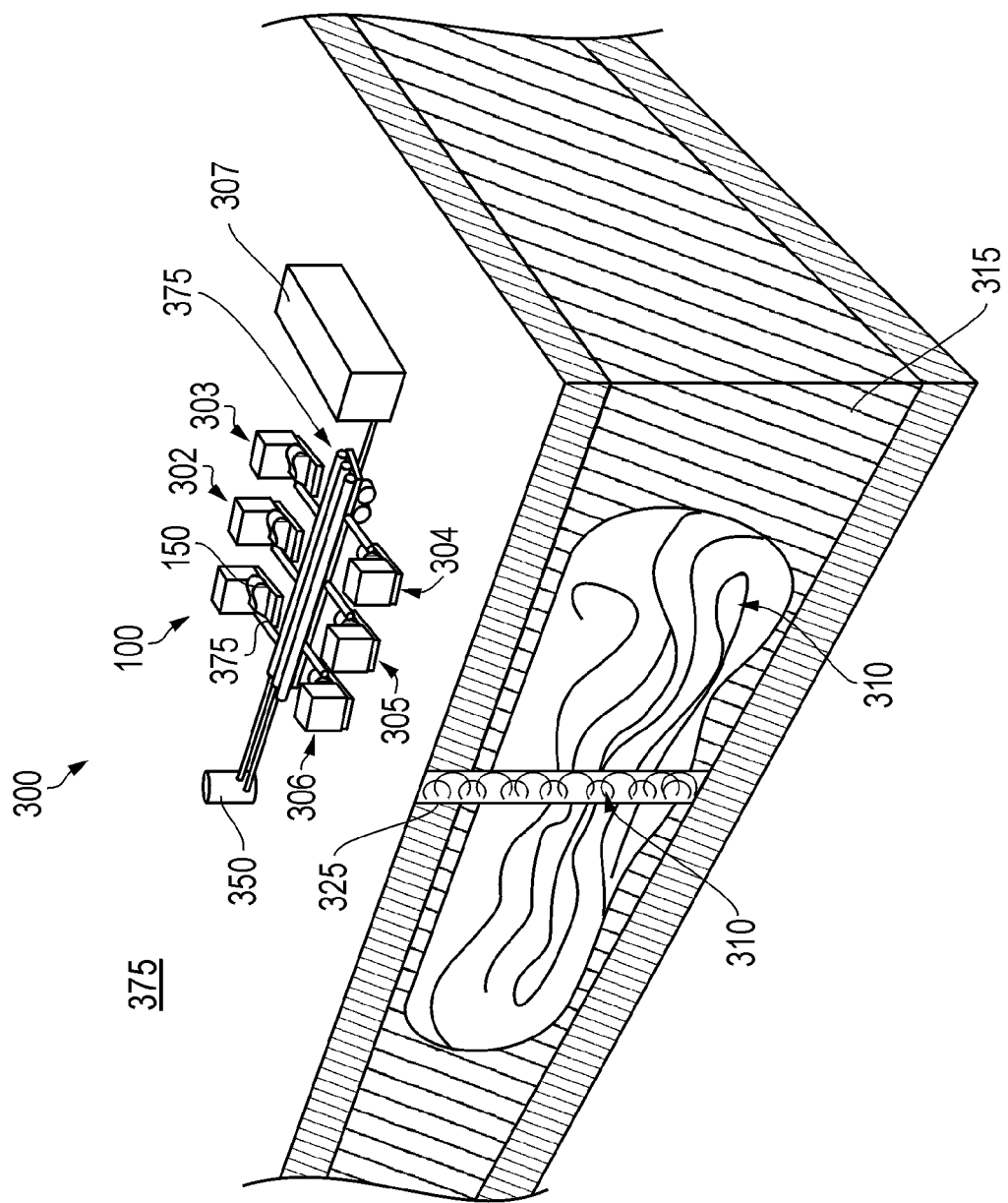
FIG. 3 is a perspective partially sectional view of an embodiment of employing the pump assembly of FIG. 1 in a multi-pump operation.

Continuing now with reference to FIGS. 1-3, the above described unhealthy condition of a failing pump valve seal 260 may be acoustically detectable by the acoustic sensor 110 as indicated. However, as shown in FIG. 3, the pump 150 may be part of but one pump assembly 100 of a multi-pump assembly 300 at a production site 375. Therefore, embodiments described herein include techniques for discerning acoustic data emanating from other assemblies 302, 303, 304, 305, 306 and equipment from the acoustic data of the pump assembly 100 such as that indicative of the unhealthy condition of the valve seal 260 as indicated.

As shown in FIG. 3, and indicated above, multiple pump assemblies 302, 303, 304, 305, 306 are provided at the production site 375 in addition to the pump assembly 100 of FIG. 1. Each of the assemblies 302, 303, 304, 305, 306, and 100 may be no more than 10-12 feet from one another, with each operating at 1,500 Hp to 5,000 Hp to propel an abrasive fluid 310 into a well 325. The abrasive fluid 310 may be directed into the well 325 and directed to fracturable rock 315 or other earth material as is the nature of a convention fracturing operation.

Apart from the acoustics emanating from the pump assembly 100 of FIG. 1, a considerable amount of noise is generated in the above described fracturing operation of FIG. 3. In fact, in continuing with reference to FIG. 3, added equipment such as a blender 307 may be provided on site adding noise to the operation. Furthermore, each assembly 302, 303, 304, 305, 306, and 100 may generate up to about 20,000 PSI for directing the abrasive fluid 310 through a common manifold 375 and to a well head 350 coupled to the well 325. That is, all of the assemblies 100, 302, 303, 304, 305, 306 may be in fluid communication with one another. As a result of such communication, the ability of acoustics emanating from a single pump assembly to resonate at an adjacent pump assembly is enhanced. Thus, referring back to FIG. 1, the ability of the pump integrity monitor 101 to decipher the source of acoustics for establishing the condition of its associated pump assembly 100 in particular, may be of significant benefit.

Continuing with reference to FIGS. 1-3, in spite of the above described fluid communication among pump assemblies 100, 302, 303, 304, 305, 306 during conventional operations such as fracturing, the pump integrity monitor 101 is configured for use in a manner that allows deciphering and favoring the acquisition of acoustic information relative to its own particular pump assembly 100. This may be achieved by the pump integrity monitor 101 employing both the above noted high speed acquisition board in combination with one or both of two sensors 110, 179 positioned to enhance the sensing of acoustic information from the pump assembly 100 of FIG. 1 in particular. That is, as indicated, the high speed acquisition board may be dedicated to sampling sensor data at a rate of between about 100 to about 300,000 samples per second or more. Thus, as detailed further below, the acquisition of acoustic data from the pump assembly 100 of FIG. 1 may be enhanced by use of the sensors 110, 179 positioned as indicated above whereas the resolution of this acoustic data may be enhanced by use of such a high speed acquisition board.

Continuing with reference to FIGS. 1-3, the pump integrity monitor 101 may be directly wired to one or both of two sensors 110, 179 positioned to enhance the sensing of acoustic information from the pump assembly 100 of FIG. 1 in particular. For example, the first sensor, the above described acoustic sensor 110, is positioned directly on the fluid housing 157 of the pump 150. The second sensor, the above noted pressure transducer 179, may be positioned within the common fluid line 175 to the manifold 375. While positioned in a common fluid area, the pressure transducer 179 is located to the pump side of choke 177 that briefly cuts down the inner diameter of the line 175 (e.g. about in half). This contributes to the attenuation of acoustics emanating from outside of the pump assembly 100 of FIG. 1. Thus, the sensing of acoustic information from the pump assembly 100 of FIG. 1 by the pressure transducer 179 is still enhanced. In fact, the location of the choke 177 also aids in dampening of acoustics from the pump assembly 100 of FIG. 1 to other assemblies 302, 303, 304, 305, 306 such as those of FIG. 3.

In addition to the enhanced acquisition of acoustic data from the pump assembly 100 of interest, the enhanced resolution of data as indicated renders noise from other sources of little significance. A speed sensor such as a proximity switch 120 may be provided to the pump integrity monitor 101 and coupled to a rotating driveline mechanism 180 for monitoring speed of the operating assembly 100, thus, allowing the processor to confirm outside noise as out of sync from the assembly 100. Therefore, with added reference to FIG. 3, such a high rate of acoustic sampling by the pump integrity monitor 101, the need to operate separate assemblies 100, 302, 303, 304, 305, 306 of a multi-pump operation at significantly different and/or constant speeds is substantially obviated. Rather, distinction between noise emanating from outside sources, out of time from the associated assembly, may readily be deciphered by a processor of the pump integrity monitor 101 with such a vast amount of acoustic data at its disposal.

As described above, the pump integrity monitor 101 may be employed to diagnose an unhealthy condition such as a leaking pump valve seal 260 in spite of surrounding noise at a production site 375. Furthermore, all other assemblies 302, 303, 304, 305, 306 of a multi-pump operation such as that shown in FIG. 3 may be equipped with individual pump integrity monitors for diagnosis of unhealthy conditions of the associated pump assembly 302, 303, 304, 305, 306. Again, such unhealthy conditions may include leaking pump seals, plunger wear, valve spring wear, loosening engine mounts, pump mounts, piston issues, deteriorating crankshaft bearings, crossheads, pony rods, transmission breakdowns such as clutch slippage or broken gear teeth and any other conditions presenting acoustic abnormalities.

While the above described techniques of employing the pump integrity monitor 101 provide detection of the health of a given assembly 100 regardless of surrounding noise, acoustic data indicative of equipment health or integrity may also be employed in a manner drastically reducing the amount of processor capacity required for establishing equipment health. That is, rather than sampling the above noted acoustic data at a constant rate (i.e. equidistant sampling) and performing an FFT to plot the information, acoustic data may be sampled at a rate based on the speed of the operating equipment (i.e. non-uniform or angular sampling). In this manner the need for a discrete FFT conversion may be eliminated or transferred to the angular domain, also referred to herein as the "order" space. The pump integrity monitor 101 may be provided with the capability to detect and analyze much higher frequencies. For example, frequencies substantially beyond 25 KHz, more preferably beyond 100 KHz may be analyzed by a processor of the pump integrity monitor 101. As a result, leaks or other acoustically detectable problems encountered by the pump assembly 100 may be detected much earlier on, when presenting at such higher frequencies. In fact, in an alternate embodiment, a very limited Fourier analysis may be performed over a small frequency range in order to increase spectral resolution. Nevertheless, the signal detection may be obtained earlier on at higher frequencies.

For example, with reference to FIGS. 1-3 above, the pump integrity monitor 101 may sample acoustic data at a rate of between about 50 and 5,000 samples per revolution of the crankshaft 155. Thus, positioning information relative to cycling of the pump 150 may automatically be provided without any need to perform FFT conversions. In order to regulate the sampling of acoustic data in this manner, a sensor may be provided to monitor or track the timing of a moving part of the pump 150 and thus, its speed. For example, as shown in FIG. 2, an index sensor 225 is provided adjacent a plunger 290 that is driven by the noted crankshaft 155 of FIG. 1. The plunger is equipped with a collar 227 detectable by the index sensor 225 such that timing information may be transmitted to the pump integrity monitor 101. In this manner, the processor of the pump integrity monitor 101 need only keep time of the operating pump 150 in acquiring and plotting acoustically obtained data relative thereto.

Figure 4:
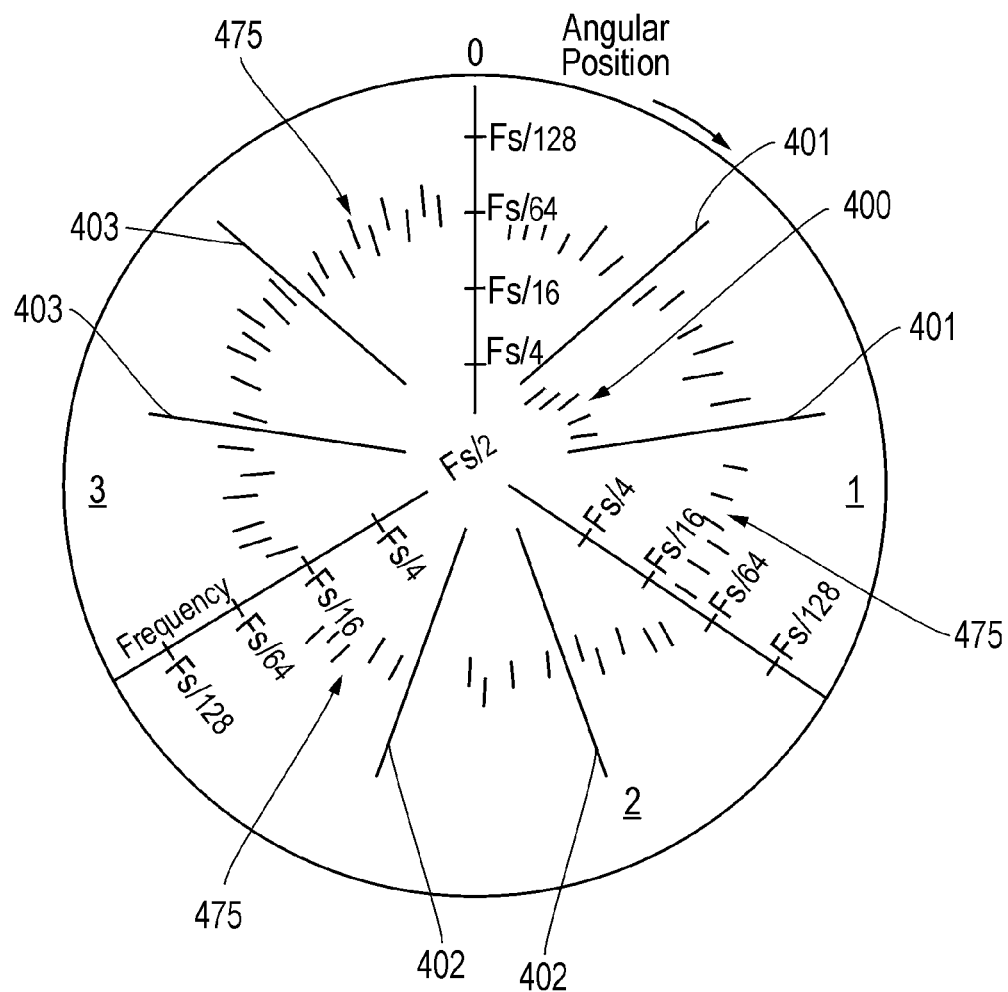
FIG. 4 is a chart depicting data obtained by employing an embodiment of the pump integrity monitor and pump assembly of FIG. 1.

Referring now to FIG. 4, with added reference to FIGS. 1-3, acoustic data acquired by the pump integrity monitor 101 via techniques described above is plotted on a chart. The chart shown plots acoustic data that has been obtained from a pump assembly 100 having a pump 150 with a leaking valve seal 260 as shown in FIG. 2. In the embodiment shown, between about 500 and about 5,000 samples of acoustic data have been obtained for a given revolution of the crankshaft 155 of the pump 150. Thus, given timing information from the index sensor 225 acoustic data has been plotted without the requirement of FFT conversions, thereby saving substantial processor capacity of the pump integrity monitor 101.

Continuing with reference to FIG. 4, timing information from the index sensor 225 allows for the plotting of an acoustic profile of the angular position of the cycling pump 150 based on three plunger reciprocation areas 1, 2, 3. That is, in the embodiments described herein, the pump 150 is of a positive displacement triplex configuration. Thus, three separate plungers, such as the plunger 190 of FIG. 2, reciprocate in any given cycle of the pump 150. A variety of acoustic data 400, 401, 402, 403, 475 may be plotted in accordance therewith.

The chart of FIG. 4 reveals that certain acoustic data is persistent throughout an entire cycling of the pump 150. This persistent acoustic data 475 may be the expected acoustics of the operating pump 150 and other equipment of the assembly 100. Due to the improved resolution and enhanced detection provided by the pump integrity monitor 101 as detailed above, the probability of an overwhelming amount of persistent acoustic data 475 emanating from another assembly (i.e. 302, 303, 304, 305, 306 of FIG. 3), is minimized Regardless, such data fails to be indicative of an unhealthy condition of the pump 150 associated with the pump integrity monitor 101 being employed.

The chart of FIG. 4 is depicted in a logarithmic scale as alluded to above, with a maximum frequency detectable at half the sampling frequency (i.e. Fs/2). With respect to particular plunger reciprocation areas 1, 2, 3 of the chart, each includes strike data 401, 402, 403, revealing two valve strikes per plunger reciprocation, resonating at between about 1/64 and about 3/8 of the sampling frequency (Fs). This would be expected as described in detail above with respect to FIG. 2 where valves 250, 255 strike valve seats 280, 285 as described above. Again, this particular acoustic data fails to be indicative of any unhealthy condition of the pump assembly 100.

Unfortunately, upon close examination of the first plunger reciprocation area 1 an unhealthy condition of the pump assembly 100 is revealed. That is, recalling the leaking valve seal 260 of FIG. 2, unhealthy acoustic data indicative of this leak presents in the form of leak data 400 in the first plunger reciprocation area 1. The leak data 400 presents immediately after the striking of a valve (i.e. 250) as shown by the strike data 401. As described with reference to FIG. 2, it is at this time that a completed seal fails to form between the valve 250 and the valve seat 280. Thus, an acoustic vibration, depicted here as leak data 400, resonates as fluid leaks between the chamber 235 and the dispensing channel 240. An unhealthy condition of the pump assembly 100 is thereby detected and displayed.

In FIG. 4 detailed above, leak data 400 is depicted in a chart that reflects the angular position of a cycling pump 150 such as that of FIG. 1. The depiction of acoustic leak data 400 in this manner provides some insight into the condition of pump parts driven by a rotating mechanism such as the crankshaft 155. However, with reference to FIG. 1, a variety of other equipment such as an engine 125, transmission 140 or driveline mechanism 180 may also be subject to wear and breakdown. Similarly, the health of such equipment may be detected and monitored according to techniques described above. That is, the above-described techniques may be employed for analyzing both pump and engine data. For example, acoustic data corresponding to a gear ratio employed by the transmission 140 may be indicative of a problem prior to the driveline mechanism 180. Similarly, as described below, unexpected acoustic data corresponding to the rpm of the engine 125 may be indicative of engine side issues such as with engine mounts or piston reciprocation. Additionally, it may be of benefit to examine the acoustics of such equipment in terms other than angular positioning. For example, the amplitude or power (or power spectral density), as shown in FIG. 5A, may provide insight into the condition of operating equipment in other frequency ranges as detailed further below.

Figure 5A:
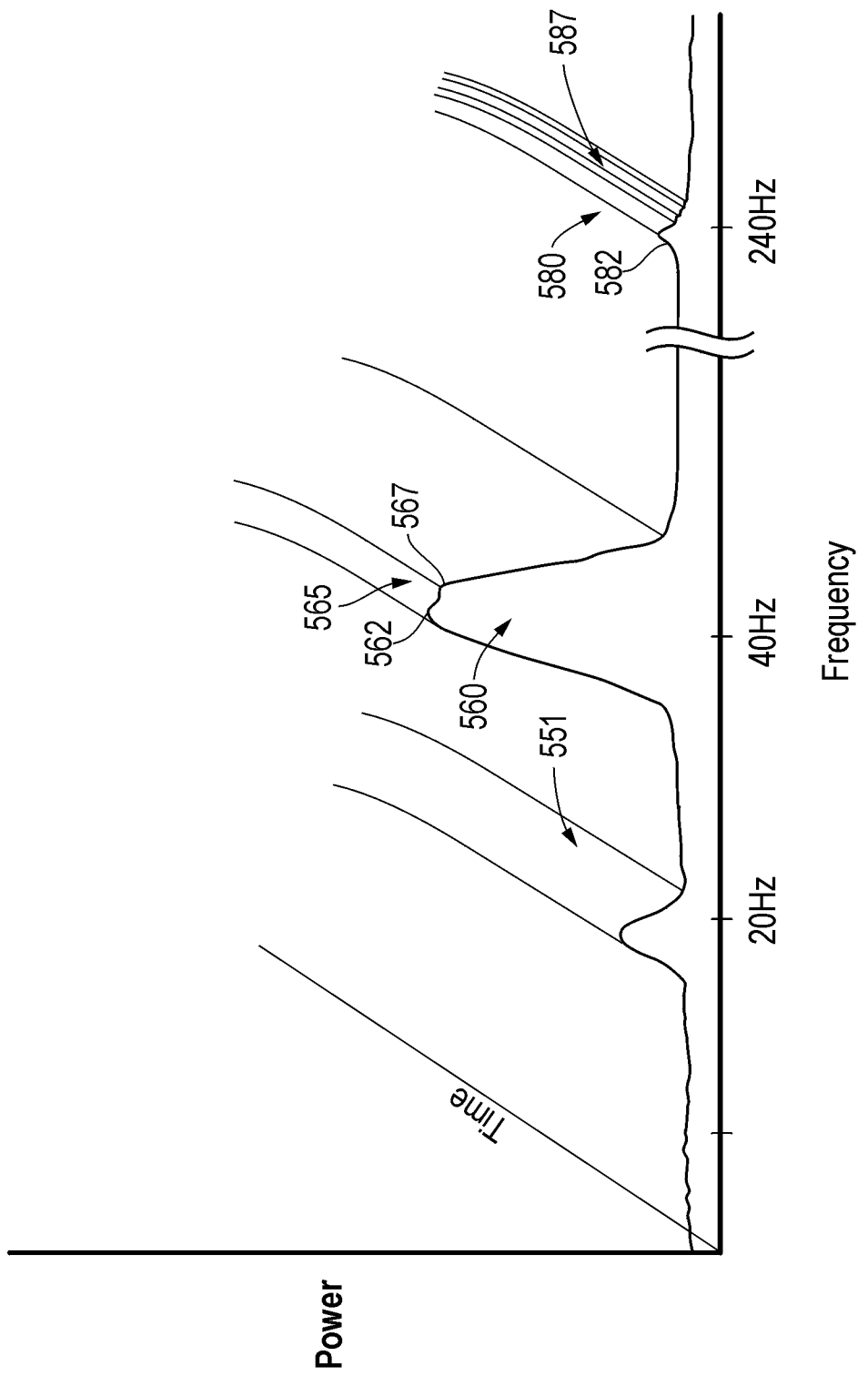
FIG. 5A is a graph depicting data obtained from employing an embodiment of the pump integrity monitor and pump assembly of FIG. 1.

Referring now to FIG. 5A, with added reference to FIG. 1, a graph is shown depicting an acoustic profile of acoustic data acquired from a pump assembly 100 having a four stroke 12 cylinder engine 125 that is running at about 2,400 rpm's. This may be the same pump assembly 100 as that depicting the acoustic data of FIG. 4. However, by way of comparison, the acoustic data of FIG. 4 presents at frequencies higher than the chart of FIG. 5A extends. However, an extension of FIG. 5A in terms of frequency would reveal the acoustic pump related data depicted in FIG. 4. Another distinction from FIG. 4 is that in FIG. 5A, rather than depicting the acoustic frequency data against angular positioning, the graph of FIG. 5A depicts acoustic data against power as described further below.

With added reference to FIG. 1, FIG. 5A depicts acoustic data relative to an engine 125 operating at about 2,400 rpm as indicated. Such an engine 125 would generate a frequency of about 40 Hz by definition. Thus, an examination of the chart of FIG. 5A at about 40 Hz reveals acoustic engine rpm data 560. In fact, the greatest amount of power revealed for the frequency range depicted in FIG. 5A is revealed in the form of the acoustic engine rpm data 560. Other acoustic data is revealed such as camshaft data 551 at about 20 Hz and piston data 580 at about 240 Hz. Again, given a conventional 12 cylinder engine 125 running at about 2,400 rpm, the location of camshaft data 551 at half that of the engine rpm data 560 and the location of the piston data 580 is to be expected. However, abnormalities in such data may be telling. For example, an abnormality in the camshaft data 551 may be indicative of misfiring whereas an abnormality in rpm data 560 may be indicative of engine imbalance, misalignment, abnormal torque reaction, or a weak foundation of the engine 125.

While the location of the acoustic data 551, 560, 580 reflects the expected operating acoustics of a 12 cylinder engine 125 operating at 2,400 rpm, additional acoustic information is presented in the graph of FIG. 5A. Namely, engine rpm data 560 presents with a peak 565 that breaks into a smooth portion 562 and a smaller rough portion 567 by comparison. Similarly, the piston data 580 includes a smooth portion 582 and a rough portion 587. Thus, it is apparent that a problem has arisen in the firing or operating of at least one of the pistons of the engine. That is, rather than acoustic leak data 400 apparent in FIG. 4, rough portions 567, 587 of data present in FIG. 5A revealing an unhealthy condition in the pump assembly 100 outside of the pump 150. Fortunately, however, with particular reference to the z-axis of the chart of FIG. 5A, it does not appear that the problem is increasing over the period of time shown. Therefore, an operator may have time to intervene before failure of the operating pump assembly 100 due to the problem shown.

In addition to the acoustic data depicted in FIG. 5A 551, 560, 580, additional data relative to the condition of the engine 125 may be obtained. For example, in such an engine 125 as described above, cylinder combustion peaks at about 60 Hz, 100 Hz, 140 Hz, and 180 Hz might be expected along with peaks representing harmonics of crankshaft speed at about 80 Hz, 120 Hz, 160 Hz, and 200 Hz. Such acoustic data may again be analyzed to determine a condition of the engine 125. For example, a peak representing crankshaft harmonics at about 80 Hz that is significantly higher than other crankshaft harmonic peaks may be indicative of a problem such as vibration damper failure relative to a position of the rotating crankshaft.

Figure 5B:
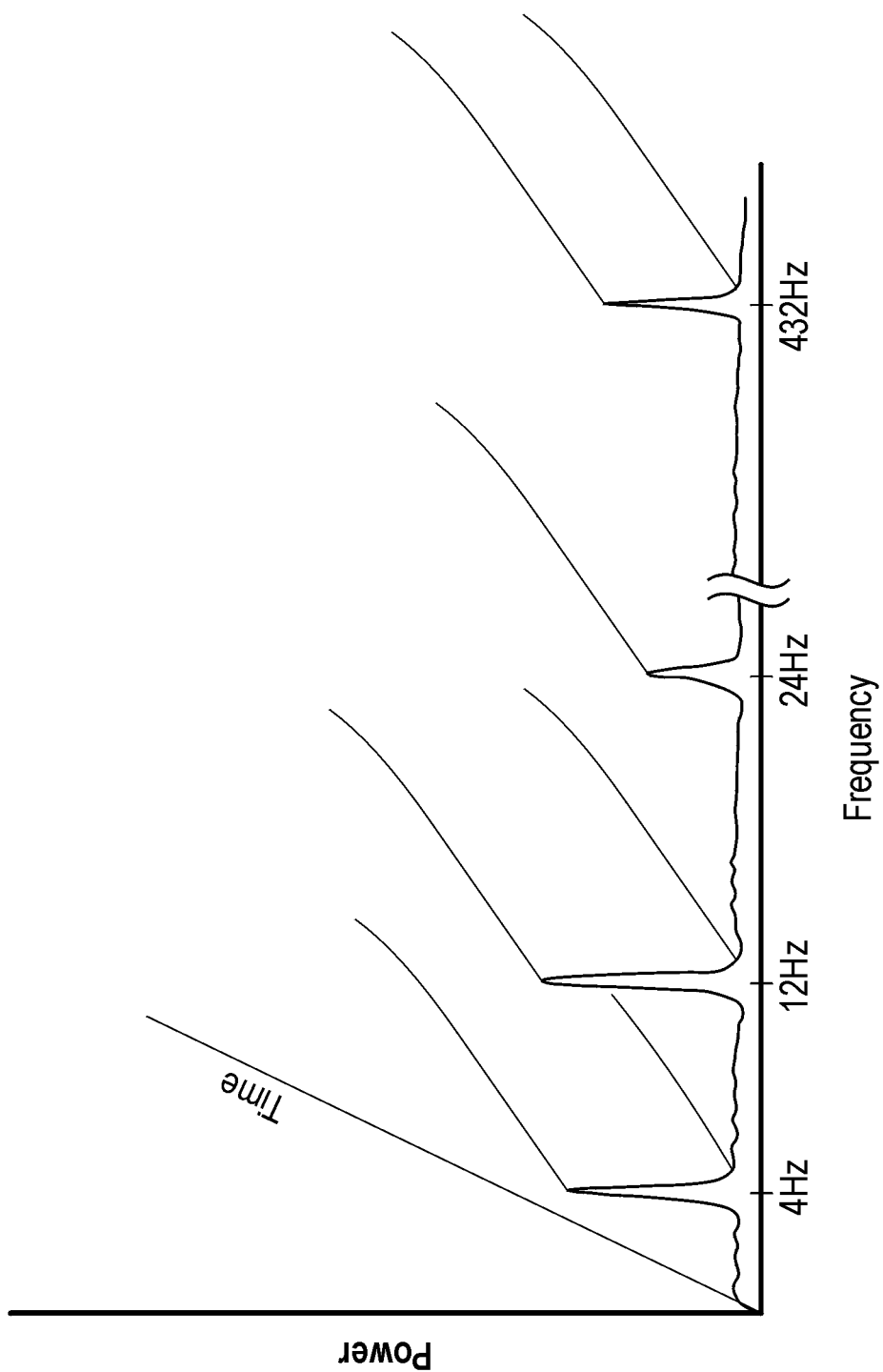
FIG. 5B is a graph depicting data obtained from employing another embodiment of the pump integrity monitor and the pump assembly of FIG. 1.

Referring now to FIG. 5B, again with added reference to FIG. 1, a graph is shown similar to that of 5A, but with reference now to pump acoustics (i.e. as opposed to engine acoustics). For the embodiment shown and described below, the pump 150 is a positive displacement pump 150 of a triplex configuration. The pump 150 includes a crankshaft 155 rotating at a frequency of about 4 Hz where an initial peak is depicted. In a circumstance of an unhealthy pump condition correlating to the timing of the crankshaft rotation, the peak depicted at about 4 Hz may rise or present otherwise abnormally. Such pump failures may include a valve leak, broken valve spring, loose plunger, loose pump mount, or crank bearing failure.

Given that the pump 150 employs three plungers 290 as indicated above, each reciprocating with every rotation of the crankshaft 155, the peak at about 12 Hz is to be expected. Furthermore, a peak is noted at about 24 Hz which reflects a reduction ration of about six that is provided by gearing between the transmission 140 and the crankshaft 155. For the embodiment shown, a high peak at about 24 Hz would be indicative of problems such as with the transmission 140, driveline 180, or related parts. Similarly, where a bull gear of the described gearing is equipped with say 108 teeth, a harmonic peak at about 432 Hz would be expected as shown. Abnormalities in this peak would be indicative of degradation or other problems with gearing teeth for the depicted embodiment.

Figure 6:
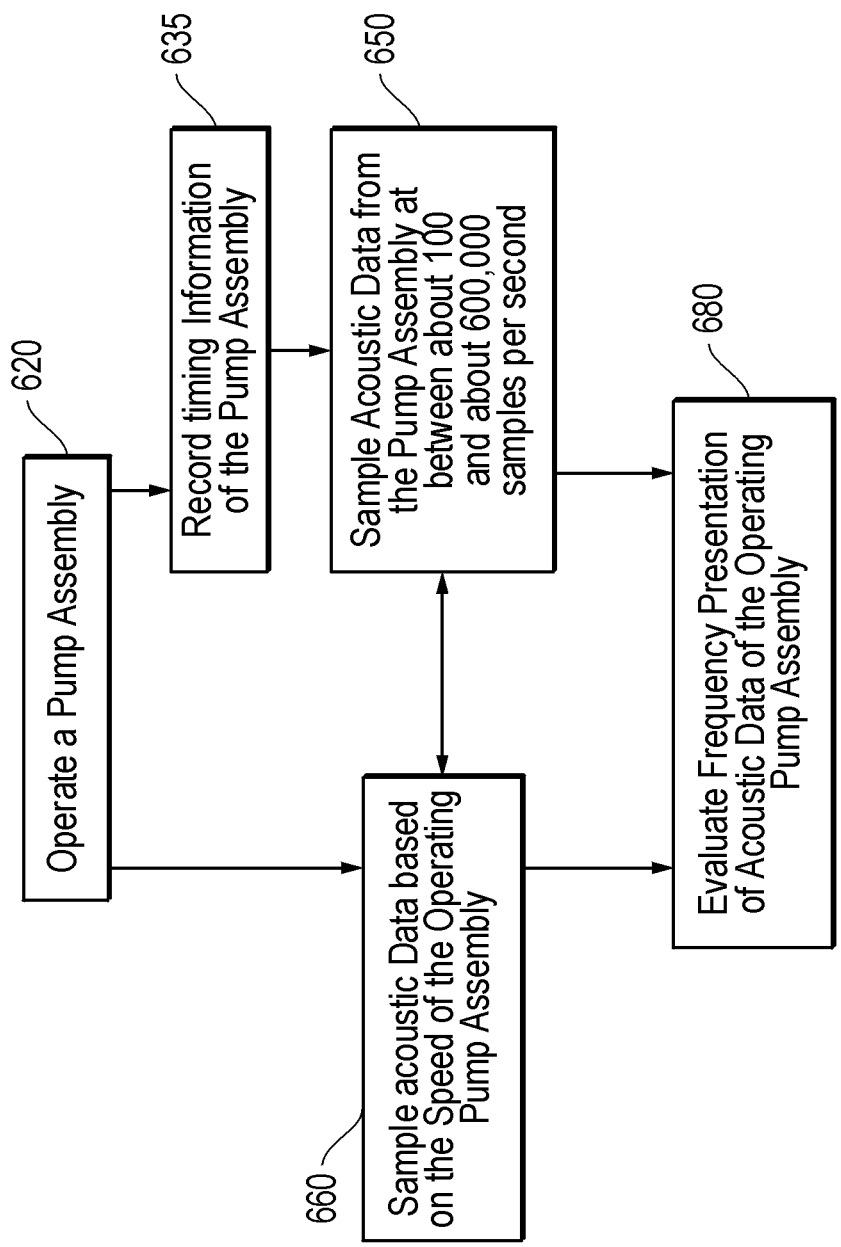
FIG. 6 is a flow-chart summarizing an embodiment of employing the pump integrity monitor and pump assembly of FIG. 1.

Referring now to FIG. 6, an embodiment of employing a pump integrity monitor is summarized in the form of a flow chart. The monitor is employed as a part of a pump assembly that is in operation as indicated at 620. As noted above, the pump assembly may be operated in conjunction with a host of other equipment, including other pump assemblies in fluid communication therewith. Nevertheless, as indicated, the pump integrity monitor may be employed to decipher the health or integrity that is particular to the pump assembly.

Deciphering the health of the pump assembly may be achieved in part by employing the pump integrity monitor to record timing information of the pump assembly as indicated at 635 (e.g. perhaps with a proximity switch). With timing information in mind, a vast amount of acoustic data may be sampled with a high speed acquisition mechanism, perhaps at between about 100,000 and 300,000 samples per second as indicated at 650. With properly located sensors to obtain such samples, a fairly high resolution of the acoustics of the operating assembly may be obtained for evaluation as indicated at 680. Additionally, the acoustic data may be sampled based on the speed of the pump as noted at 660 such that an FFT conversion of such data may be entirely avoided saving significant processing capacity of the pump integrity monitor.

Embodiments described herein include a method of monitoring pump integrity with a pump integrity monitor in a manner that distinguishes outside noise from acoustics related to the pump. In fact, even where surrounding noise emanates from other pumps fluidly coupled to the pump of interest, the pump integrity monitor is operated so as to distinguish outside noise without requiring that other pumps be operated at substantially different speeds or constant rates of speed. Thus, there is no need to place undue loads on certain pumps of a multi-pump operation in order to acoustically monitor the operating health of each pump. Furthermore, the pump integrity monitor is operated in such a manner so as to dramatically increase processing capacity by elimination of FFT conversion requirements and to shorten time for diagnosis of the health of the pump. Thus, the practical effectiveness of acoustic diagnostics of an operating pump assembly may be significantly improved.

Although exemplary embodiments describe particular techniques for monitoring pump assemblies such as positive displacement pumps for fracturing applications, additional embodiments are possible. For example, several pump integrity monitors may be coupled to a central host or one another over a network for analysis of operational conditions at a variety of pumps or even multiple operation sites. Additionally, analysis techniques described above may be further and more particularly tailored based on program configuration. In one example, spectrum averaging bound to timing positions (i.e. stacking) may be employed to reduce noise and improve resolution irrespective of steady or repeatable conditions. Cepstral analysis may also be employed for multiple harmonics originating from a variety of mechanical parts. Joint time-frequency analysis may even be employed to handle time-varying frequency content through patter recognition in two dimensional time-frequency space wherein a Bayesian-based pattern classification technique is employed with an embedded database of vibration signatures.

In addition to that above, methods may be employed tailored to the pump integrity monitor electronics employed. In this regard, interleaved virtual sub-devices may be integrated into a single firmware frame, re-programmable virtual devices may be employed with functionality based on a particular frequency range of interest while still within a single frame, and portable device implementation may be employed.

Further additional features may be provided for employing the pump integrity monitor described herein such as pre-programming of the pump integrity monitor with a variety of vibration signatures to enhance pattern recognition for the types of problems likely to be acoustically detected during pump operation. In fact, to enhance such recognition, applications may be run that tend to avoid natural operating frequencies that may overlap with frequencies otherwise reflective of an unhealthy pump condition. Furthermore, many other changes, modifications, and substitutions may be made without departing from the scope of the described embodiments.

An exemplary embodiment is a method of monitoring integrity of a pump assembly, the method including operating the pump assembly, recording timing information relative to the operating, sampling acoustic data with a high speed acquisition mechanism of the pump assembly, and evaluating the acoustic data in light of the timing information. The method further includes sampling the acoustic data at a rate of more than 100,000 samples per second, where the high speed acquisition mechanism is a high speed acquisition board of a pump integrity monitor for the recording, sampling, and evaluating. The exemplary method further includes distinguishing acoustic data that represents a healthy pump assembly condition from acoustic data that represents an unhealthy pump assembly condition, where the unhealthy condition is a pump mount, a plunger, a crankshaft bearing, a transmission, a pump valve seal, a valve spring, a crosshead, a pony rod, and/or a piston operation of the pump assembly. The exemplary method further includes distinguishing the healthy pump assembly condition from the unhealthy pump assembly condition with reference to a vibration signature pre-programmed into a processor of the pump integrity monitor. The method further includes monitoring a position of a moving part of the pump assembly, where the monitoring is achieved with a speed sensor coupled to a driveline mechanism of the pump assembly. The operating of the pump assembly may be performed at a given speed, where the sampling occurs at a rate based on the given speed.

Another exemplary embodiment is a method of monitoring integrity of a pump assembly, where the method includes operating the pump assembly, monitoring a speed of the operating, sampling acoustic data from the pump assembly at a rate based on the speed, and evaluating the acoustic data for distinguishing acoustic data that represents a healthy pump assembly condition from acoustic data that represents an unhealthy pump assembly condition. The method includes sampling the acoustic data at a rate between 50 and 5,000 samples of the acoustic data per rotation of a crankshaft that is a part of the pump assembly. In further embodiments, the method includes tracking a position of a moving part of the pump assembly, where the pump assembly is a positive displacement pump assembly and the moving part is a plunger, where the monitoring is achieved with an index sensor coupled to a plunger housing of the pump assembly, the plunger housing accommodating the plunger, and the plunger having a collar detectable by the index sensor. Further embodiments include evaluating without performing a discrete FFT, analyzing acoustic data in frequencies between 100 Hz and 600 kHz, performing the evaluation as the speed varies, and/or distinguishing with reference to a vibration signature loaded into a processor of a pump integrity monitor. Certain embodiments include distinguishing a healthy pump condition by recognizing noise based on the speed, sampling at a rate of more than about 100,000 samples of the acoustic data per second, and sampling at a constant or variable sampling rate.

Another exemplary embodiment includes a pump integrity monitor having a processor, a speed sensor coupled to the processor for monitoring a speed on the operating pump assembly, and a data sensor coupled to the processor for sampling harmonic data from the pump assembly at a rate based on the speed. The pump integrity monitor further includes the speed sensor as an index sensor or a proximity switch for tracking a position of a moving part of the pump assembly, and/or the data sensor coupled to the processor via a high speed acquisition board to acquire the harmonic data at a rate of more than about 100,000 samples per second. In certain embodiments, the data sensor is an accelerometer coupled to the operating pump or a pressure transducer coupled to a fluid line for receiving fluid pumped by the operating pump, and the data sensor may further be a first data sensor where the pump integrity monitor further includes a second data sensor that is an accelerometer or pressure transducer and wherein the harmonic data from each of the first and second data sensors is simultaneously analyzed and correlated.

Yet another exemplary embodiment is a pump assembly including a pump, a pump integrity monitor having a speed sensor coupled to the pump for monitoring a speed of the pump during the operation, and an acoustic sensor coupled to the pump integrity monitor for sampling acoustic data at a rate based on the speed. The pump assembly further includes a processor coupled to the pump integrity monitor for distinguishing acoustic data that represents a healthy assembly condition from acoustic data that represents an unhealthy pump assembly condition. The pump assembly may be a positive displacement pump that includes a crankshaft for rotation during operation, where the sampling occurs at a rate of between 50 and 5,000 samples of the acoustic data per rotation. The pump assembly further includes a plunger having a detectable collar secured to the plunger, the plunger coupled to the crankshaft, and a fluid housing accommodating the plunger, with a speed sensor coupled to the fluid housing. The speed sensor is an index sensor for detecting a position of the detectable collar as the crankshaft reciprocates the plunger during the rotation. The pump assembly includes a positive displacement pump, a centrifugal pump, a triplex pump, a fracturing pump, a cementing pump, a coiled tubing pump, and/or a pump for water jet cutting. The pump assembly further includes an engine for driving the operation of the pump, a transmission coupled to the pump and the engine for directing the driving, and a platform securing the engine, the transmission, the pump, and the pump integrity monitor thereto.

The pump assembly further includes the pump integrity monitor as a first pump integrity monitor, and a second pump integrity monitor having a second speed sensor coupled to a second pump for monitoring a speed of the second pump during operations of the second pump, and a second acoustic sensor coupled to the second pump integrity monitor for sampling acoustic data at a rate based on the speed of the second pump. The pump assembly further includes the first pump integrity monitor coupled to the second pump integrity monitor to obtain data from the second pump. A further embodiment includes a central host for analysis of data from the first and second pumps simultaneously, where the central host is a first central host coupled to a second central host at a remote location for analysis of data from each of the first and second central host.

A still further exemplary embodiment is a multi-pump assembly including a first assembly having a first pump integrity monitor with a speed sensor coupled to a pump of the first pump assembly for monitoring a speed thereof, an acoustic sensor for sampling acoustic data at a rate based on the speed, a second pump assembly having a second pump integrity monitor with a speed sensor coupled to a pump of the second pump assembly for monitoring a speed thereof, an acoustic sensor for sampling acoustic data at a rate based on the speed, and a common manifold in fluid communication with the first pump assembly and the second pump assembly. The multi-pump assembly further includes a first pump integrity monitor that deciphers acoustic data of the first pump assembly and a second pump integrity monitor that deciphers acoustic data of the second pump assembly. The multi-pump assembly includes the acoustic sensor of the first pump integrity monitor as one of an accelerometer coupled to the pump of the first pump assembly and a pressure transducer disposed within a fluid line coupling the common manifold and the first pump assembly. The multi-pump assembly further includes the fluid line equipped with a choke disposed therein and positioned between the pressure transducer and the common manifold for attenuating acoustics from the second pump assembly toward the first pump integrity monitor and/or dampening acoustics from the first pump assembly toward the second pump integrity monitor. The multi-pump assembly further includes a high speed acquisition board that acquires the acoustic data from the acoustic sensor of the first pump integrity monitor at a rate of more than 100,000 samples per second.

We claim:

1. A method, comprising:
   operating a pump assembly comprising a prime mover and a pump;
   determining timing information corresponding to one of the prime mover and the pump;
   sampling acoustic data with a high speed acquisition mechanism of the pump assembly;
   discerning by a processor acoustic data from the pump assembly and acoustic data from other pump assemblies or equipment in response to the timing information so as to determine an unhealthy condition of the pump assembly.

2. The method of claim 1, further comprising sampling the acoustic data in response to the timing information corresponding to one of the prime mover and the pump.

3. The method of claim 2, wherein the sampling the acoustic data comprises performing angular sampling, and wherein the determining an unhealthy condition of the pump assembly comprises analyzing frequency data corresponding to angular position without a Fast Fourier Transform.

4. The method of claim 3, wherein the frequency data comprises data having a frequency greater than 100 kHz.

5. The method of claim 2, wherein the sampling the acoustic data comprises performing angular sampling, and wherein the determining an unhealthy condition of the pump assembly comprises analyzing frequency data corresponding to angular position with a limited Fourier analysis in a small frequency range.

6. The method of claim 2, wherein the sampling the acoustic data comprises performing angular sampling, and wherein the determining an unhealthy condition of the pump assembly comprises analyzing frequency data corresponding to angular position with a Fourier analysis in the angular domain.

7. The method of claim 1, further comprising sampling the acoustic data in response to timing information corresponding to the prime mover.

8. The method of claim 7, wherein the timing information comprises timing information selected from the timing information consisting of a location of a rotating part of an engine, a location of an engine flywheel, and a current electrical current input.

9. The method of claim 1, further comprising dividing the acoustic data into acoustic data from the pump assembly and outside noise in response to the timing information by determining that a portion of the acoustic data is out of sync with the pump assembly.

10. The method of claim 1, further comprising positioning a choke between the pump assembly and a second pump assembly fluidly communicating with the pump assembly.

11. The method of claim 1, wherein determining an unhealthy condition of the pump assembly in response to the acoustic data from the pump assembly comprises employing a time-frequency analysis to determine a time variant frequency pattern indicating an unhealthy condition.

12. A pump integrity monitor, comprising:
    a sensor structured to monitor operational timing information one of a prime mover and a pump;
    a data sensor structured to sample harmonics of a pump assembly comprising the primer mover and the pump;
    a processor coupled to the sensor and the data sensor, the processor structured to:
        discerning acoustic data from the pump assembly and acoustic data from other pump assemblies or equipment in response to the operational timing information so as to determine an unhealthy condition of the pump assembly.

13. The pump integrity monitor of claim 12, wherein the data sensor is further structured to sample harmonics of the pump assembly at a rate based on an operating speed of the one of the prime mover and the pump.

14. The pump integrity monitor of claim 12, wherein the sensor comprises one of a proximity switch and an index sensor, and wherein the data sensor comprises at least one data sensor selected from the data sensors consisting of an acoustic sensor, an accelerometer, and a pressure transducer.

15. The pump integrity monitor of claim 12, wherein the processor is further structured to determine that a portion of the harmonics from the pump assembly is outside noise in response to the portion of the harmonics being out of sync with the operational timing information.

16. A system, comprising a first pump assembly including a first pump, a first prime mover, and a pump integrity monitor, the pump integrity monitor comprising:
    a sensor structured to monitor operational timing information one of the first prime mover and the first pump;
    a data sensor structured to sample harmonics of the pump assembly; and
    a processor coupled to the sensor and the data sensor, the processor structured to discerning acoustic data from the first pump assembly and acoustic data from a second pump assembly in response to the operational timing information so as to determine an unhealthy condition of the first pump assembly.

17. The system of claim 16, wherein said second pump assembly including a second pump and a second prime mover, wherein the second pump fluidly communicates with the first pump.

18. The system of claim 17, further comprising a choke in a fluid line, the fluid line providing the fluid communication between the first pump and the second pump, and the choke positioned between the second pump and the data sensor.

19. The system of claim 18, wherein the choke reduces a flow area of the fluid line by about 50%.

20. The system of claim 17, wherein the processor is further structured to determine the unhealthy condition of the first pump assembly during a time period where an operating speed of the first pump assembly is similar to an operating speed of the second pump assembly.

21. The system of claim 17, wherein the processor is further structured to determine the unhealthy condition of the first pump assembly during a time period where the second pump assembly has a variable operating speed.

22. The system of claim 16, further comprising a blender providing fluid to the first pump.

\* \* \* \* \*